Dec. 29, 1925.
W. C. BROWN
1,567,233
AUTOMATIC AUXILIARY CLEARANCE CONTROL
Filed Jan. 4, 1922
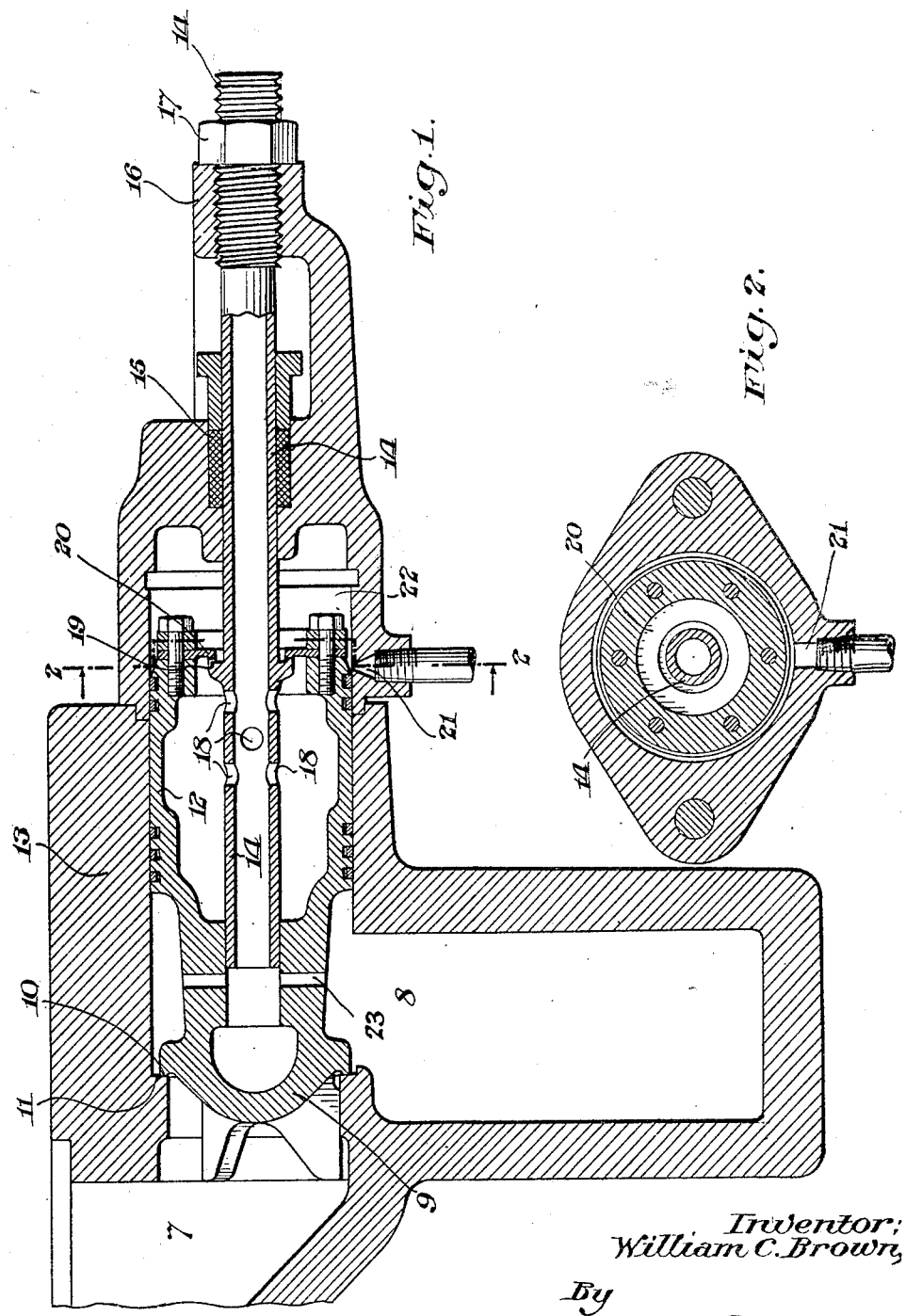
Inventor:
William C. Brown,
By
Attorney.

Patented Dec. 29, 1925.

1,567,233

UNITED STATES PATENT OFFICE.

WILLIAM C. BROWN, OF PRESCOTT, ONTARIO, CANADA, ASSIGNOR TO STUMPF UNA-FLOW ENGINE COMPANY, INC., A CORPORATION OF NEW YORK.

AUTOMATIC AUXILIARY CLEARANCE CONTROL.

Application filed January 4, 1922. Serial No. 526,990.

*To all whom it may concern:*

Be it known that I, WILLIAM C. BROWN, a subject of the King of Great Britain, residing at Prescott, in the Province of Ontario, Canada, have invented new and useful Improvements in Automatic Auxiliary Clearance Controls, of which the following is a specification.

The invention relates to automatic auxiliary clearance control. The object is to provide improved method and means for automatically controlling communication between the normal clearance space of a steam cylinder and an auxiliary clearance space.

The invention comprises method and means whereby communication is opened between the cylinder and the auxiliary clearance space upon excessive compression pressure in the cylinder, and whereby said communication is interrupted or closed upon a below atmospheric pressure in the cylinder, and whereby said closure is maintained by the pressure of live steam, until said live steam pressure is overcome by said excessive compression pressure in the cylinder.

Referring to the drawings which illustrate merely by way of example, suitable means for effecting my invention:—

Fig. 1 is a longitudinal section of valve construction embodying my invention.

Fig. 2 is a horizontal section on line 2—2 of Fig. 1.

Similar numerals refer to similar parts throughout the several views.

In the example shown in the drawings, the normal clearance space of the cylinder is indicated by 7; the auxiliary clearance space by 8. Between these two spaces is the passage or port controlled by the valve member 9, having the face 10 cooperating with the valve seat 11. The valve member 9 comprises a hollow piston formation 12 operating in the cylinder 13. This piston formation 12 is movably mounted on the hollow rod 14, which passes through the stuffing box 15, and is threaded in the housing 16 connected to the cylinder body 13. The hollow rod 14 must have a piston fit in the formation 12, in order to prevent leakage of pressure from the clearance space. The lock nut 17 is provided on the upper end of the rod 14 to lock same in desired position of adjustment. The rod 14 is also provided with the openings 18 communicating with its hollow interior which communicates with atmosphere.

Rod 14 is also provided, at a point adjacent the end of the valve piston 12, with a valve seat 19 adapted to cooperate with the resilient valve member 20 bolted to the end of said valve piston. The piston formation 12 is also provided with the passage 23 for establishing communication between clearance space 8 and the interior of the hollow rod 14, when the valve member 9 is upon its seat, in order to relieve the pressure in auxiliary clearance space 8. When the valve 9 is lifted from its seat 11, to establish communication between the cylinder space 7 and auxiliary clearance 8, the passage 23 is closed by the end of rod 14. In other words it is desirable to maintain space 8 at atmospheric pressure when out of communication with cylinder space 7. The valve cylinder 13 is also provided with a live steam inlet port 21 delivering to space 22 in said cylinder at a point adjacent the end of the valve piston 12 remote from its valve face 10.

It makes very little difference at what particular point the port 21 is connected, so long as the steam pressure at such point is equal to the maximum pressure in the steam cylinder. This port is preferably connected somewhere between the throttle valve and the inlet valve, so that the steam will be shut off from 21 when it is shut off from the engine. This would also be better if the engine were running under a throttle, but in modern uniflow practice steam pressure in the cylinder is maintained as near boiler pressure as possible for economy sake.

In operation: The valve piston 12 is normally maintained on its seat 11, by the pressure of live working steam entering port 21 and exerting pressure on a piston of sufficient area to hold the valve closed against the desired compression pressure in the working cylinder. Upon a compression pressure in the cylinder space 7, sufficiently in excess of the pressure exerted by the live steam in space 22, the piston valve 9 is operated to open the passage between space 7 and the auxiliary clearance space 8, at the same time the live steam inlet port 21 is closed by the valve piston member 12 overriding the port. The movement of the piston member 12 relatively to the hollow rod 14, also serves to move the valve member 20 from its seat 19, so that the steam pressure in space 22 is permitted to pass to atmosphere through the openings 18 and the hollow rod 14. Communication will now be maintained between cylinder space 7 and auxiliary clearance space 8, until a partial vacuum or a below atmospheric pressure occurs in space 7, whereupon the atmospheric pressure on the piston member 12 will return valve member 20 to its seat 19, and then valve face 10 to its seat 11, and at the same time, this return movement of piston member 12 will open the live steam port 21, so that the live steam pressure re-established in space 22, will maintain the said valves closed until the device is again operated by the excessive compression pressure in space 7, as above described.

This automatically acting device is especially applicable to uni-flow engine cylinders operating with a condenser; in which case if the vacuum is broken the compression in the engine cylinder will run up higher than the boiler pressure, so that valve 9 will be forced open. The instant valve 9 is forced open, the exhaust valve 20 is also open, permitting the steam in cylinder space 22, to rush out through the ports 18 into the atmosphere, and at the same time, the movement of valve 9 forces the piston 12 to cover the port 21 and prevent any further inlet of live steam. The pressure in the engine cylinder will therefore force the piston 12 with valve 9 away from its seat, where it will remain as long as there is no vacuum in the engine cylinder.

In case vacuum comes on the engine, when the vacuum is in the engine cylinder the atmospheric pressure on piston 12 will push it down until valve 9 rests on its seat, at the same time closing exhaust valve 20 and opening the live steam port 21, so that the live steam will hold the valve 9 on its seat until the pressure in the engine cylinder again exceeds the live steam pressure.

As above stated the passage 23 in piston member 12, serves to maintain the auxiliary clearance space 8 at atmospheric pressure, but upon the lifting of valve member 9 from its seat the passage 23 is closed by the end of rod 14.

What I claim is:—

1. The method which consists in utilizing excessive compression pressure in a steam engine cylinder, against the pressure of live working steam exerted upon an effective area greater than that upon which the excessive compression pressure is exerted, to establish communication with an auxiliary clearance, and utilizing atmospheric pressure to close said communication when the pressure in the cylinder drops below atmosphere.

2. The method which consists in utilizing excessive compression pressure in a steam engine cylinder, against the pressure of live working steam exerted upon an effective area greater than that upon which the excessive compression pressure is exerted, to establish communication with an auxiliary clearance, utilizing atmospheric pressure to close said communication when the pressure in the cylinder drops below atmosphere, and utilizing said live steam pressure to maintain said communication closed until the recurrence of said excessive compression pressure.

3. In an auxiliary clearance valve control, the combination with a steam power cylinder of means forming an auxiliary clearance space, and a passage connecting the same with the cylinder, a valve for controlling said passage and means for normally maintaining the valve closed by the pressure of live working steam, the effective area of the valve subject to the pressure within the cylinder being less than the effective area of the means subject to the pressure of live working steam, whereby a predetermined excessive compression pressure within the cylinder is required to open the valve.

4. In an auxiliary clearance valve control, the combination with a steam power cylinder of means forming an auxiliary clearance space, and a passage connecting the same with the cylinder, a valve for controlling said passage and means for normally maintaining the valve closed by the pressure of live working steam, the effective area of the valve subject to the pressure within the cylinder being less than the effective area of the means subject to the pressure of live working steam, whereby a predetermined excessive compression pressure within the cylinder is required to open the valve, a live steam supply and an outlet to atmosphere adapted for alternate communication with the effective area of the valve closing means, said valve closing means adapted to shut off the supply of live working steam to its pressure area upon the opening of the valve and to bring said area under atmospheric pressure, so that the valve will close upon the occurrence of below atmospheric pressure in the cylinder.

5. In an auxiliary clearance valve control, the combination with a steam power cylinder of means forming an auxiliary clearance space, and a passage connecting the same with the cylinder, a valve for controlling said passage and means for normally maintaining the valve closed by the pressure of live working steam, the effective area of the valve subject to the pressure within the cylinder being less than the effective area of the means subject to the pressure of live working steam, whereby a predetermined excessive compression pressure within the cylinder is required to open the valve, a live steam supply and an outlet to atmosphere adapted for alternate communication with the effective area of the valve closing means, said valve closing means adapted to shut off the supply of live working steam to its pressure area upon the opening of the valve and to bring said area under atmospheric pressure, so that the valve will close upon the occurrence of below atmospheric pressure in the cylinder, and upon the closing of the valve to reestablish live working steam pressure upon its pressure area.

6. In combination with a steam power cylinder, means forming an auxiliary clearance space and a passage connecting the space with the cylinder, a valve controlling said passage, a piston connected with said valve having an effective pressure area greater than that of the valve, means forming an inclosed space in communication with said piston area, and means establishing communication between said space and live working steam, whereby a predetermined excessive compression pressure in the cylinder is required to open the valve against the pressure of live working steam upon the piston.

7. In combination with a steam power cylinder, means forming an auxiliary clearance space and a passage connecting the space with the cylinder, a valve controlling said passage, a piston connected with said valve having an effective pressure area greater than that of the valve, means forming an inclosed space in communication with said piston area, means establishing communication between said space and live working steam, whereby a predetermined excessive compression pressure in the cylinder is required to open the valve against the pressure of live working steam upon the piston, and means whereby the opening movement of the valve shall shut off live steam from said confined space and shall open said space to atmosphere.

WILLIAM C. BROWN.